United States Patent [19]

Harbison

[11] Patent Number: 4,781,409

[45] Date of Patent: Nov. 1, 1988

[54] AUTOMOBILE SUN VISOR ATTACHMENT

[76] Inventor: Peggy J. Harbison, 3938 S. Mission Oaks Dr., Chattanooga, Tenn. 37412

[21] Appl. No.: 112,115

[22] Filed: Oct. 26, 1987

[51] Int. Cl.⁴ .............................................. B60J 3/02
[52] U.S. Cl. .................................. 296/97.6; 296/97.8; 224/312; 206/0.81
[58] Field of Search ................ 296/97 R, 97 B, 97 C, 296/97 G; 224/277, 312; 206/0.8, 0.81

[56] References Cited

U.S. PATENT DOCUMENTS

| | | | |
|---|---|---|---|
| 2,382,875 | 8/1945 | Handley | 296/97 C |
| 2,486,096 | 10/1949 | Axford | 296/97 C |
| 2,547,101 | 4/1951 | Uttz | 296/97 C X |
| 2,839,860 | 6/1958 | Fry | 296/97 C X |
| 2,931,114 | 4/1960 | Peterson | 224/312 X |
| 2,970,864 | 2/1961 | McCann | 296/97 C |
| 3,016,262 | 1/1962 | Hunt | 296/97 C |
| 3,579,878 | 5/1971 | Griffin | 206/0.81 X |
| 3,809,428 | 5/1974 | Cohen | 224/312 X |
| 4,323,275 | 4/1982 | Lutz | 296/97 G |
| 4,690,451 | 9/1987 | Killar | 296/97 G |

FOREIGN PATENT DOCUMENTS 2332613  1/1975  Fed. Rep. of Germany .... 296/97 B

OTHER PUBLICATIONS

New York Times, May 31, 1959, Broadstreet's Advertisement.

Primary Examiner—Dennis H. Pedder
Attorney, Agent, or Firm—Jerry T. Kearns

[57] ABSTRACT

A cover for automobile sun visors is in the form of an elastic fabric stretchable cover having a plurality of storage pockets. The cover may be provided with a pouch on one side imprinted with a presonalized name plate. When the visor is in a flip down condition, the personalized name plate will be displayed through the windshield. An auxiliary sun visor with additional storage pouches is mounted for sliding movement within the elastic sun visor cover. A two channel strip mounted around the periphery of the original equipment sun visor provides support and a sliding track for the auxiliary sun visor.

8 Claims, 4 Drawing Sheets

AUTOMOBILE SUN VISOR ATTACHMENT

BACKGROUND OF THE INVENTION

1. Field of the Invention

The present invention relates to automobile sun visor attachments, and more particularly pertains to an elastic fabric cover for original equipment sun visors. Most automotive vehicles are provided with sun visors which are pivotally mounted on a visor rod for movement between flip up and flip down positions. These visors serve as a screen for blocking out the sun and may be provided with various attachments for storing items. The storage of such items on a sun visor provides easy, convenient access to these items. However, storage of various assorted items on the sun visor tends to weigh down the sun visor, and if weighed down to a large extent, the visor may sag. Also the storage of a large number of items on the sun visor can cause a cluttered appearance. Also, there is a recent and growing interest in the display of personalized logos on vehicles. Many people pay extra fees for personalized license plates, for example. Various transparent tinted decals are on the market which are bonded to an upper edge of the windshield to display a personalized logo.

2. Description of the Prior Art

Various types of automobile sun visor attachments are known in the prior art. A typical example of such an automobile sun visor attachment is to be found in U.S. Pat. No. 3,016,262, which issued to H. Hunt on Jan. 9, 1962. This patent discloses an attachment for a sun visor which clips to the original equipment sun visor. The device has a plurality of pockets for the storage of various items. The attachment is in the form of an envelope having open sides. Auxiliary sun shades are pulled from the open sides of the envelope by tabs. These auxiliary sun shapes are formed of a tinted transparent material. The auxiliary sun shade may also be hung beneath the original equipment sun visor. U.S. Pat. No. 2,486,096, which issued to J. Axford et al on Oct. 25, 1949, discloses a cover for automobile sun visors which provides a plurality of storage compartments. The cover is constructed as a rectangular envelope which is open at one side, but is provided which snap fasteners for closing the opening when the cover is placed over an original equipment sun visor. Pockets in the cover are provided with a strip of elastic material secured across the front edges to retain the edges of the pockets in a closed position. U.S. Design Pat. No. 159,945, which issued to C. Catanese on Sept. 5, 1950, discloses a receptacle for attachment to original equipment automobile sun visors. The receptacle is clipped over the original visor and provides a storage compartment. U.S. Pat. No. 2,531,295, which issued to G. Ritchie on Nov. 21, 1950, discloses a vehicle registration card and service tally holder which may be clipped over the sun visor of a vehicle. The holder is constructed as an envelope of transparent material and provides a pocket for holding various documents. U.S. Pat. No. 2,589,348, which issued to E. Diefenbach on Mar. 15, 1952, discloses an attachment for automobile sun visors which comprises two brackets which clip over opposite ends of an original equipment type sun visor and two spaced coil springs which connect to these brackets. Various articles and documents can then be stored by placing them under the stretched springs. U.S. Pat. No. 2,673,670, which issued to E. Steele on Mar. 30, 1954, discloses an automobile visor pouch designed to be attached over original equipment type sun visors. The pouch comprises a sleeve which is slipped over the sun visor and has a transparent pocket which is closed by a zipper.

While the above mentioned devices are suited for their intended usage, none of these devices provide an attachment for original equipment automobile sun visors which allow an uncluttered storage arrangement for various items. Further, none of these devices provide for an auxiliary sun visor which is provided with an adequate sliding support. Also, none of these prior art automobile visor accessories include an elastic cover which is designed to be tightly stretched over an original equipment sun visor, thus giving a neat and uncluttered appearance. Additionally, none of the above devices provide an auxiliary sliding sun visor provided with storage compartments. None of the above devices provide an auxiliary sliding sun screen which is arranged for the display of a personalized logo. Inasmuch as the art is relatively crowded with respect to these various types of automobile sun visor attachment, it can be appreciated that there is a continuing need for and interest in improvements to such automobile sun visor attachments, and in this respect, the present invention addresses this need and interest.

SUMMARY OF THE INVENTION

In view of the foregoing disadvantages inherent in the known types of automobile sun visor attachments now present in the prior art, the present invention provides an improved automobile sun visor attachment. As such, the general purpose of the present invention, which will be described subsequently in greater detail, is to provide a new and improved automobile sun visor attachment which has all the advantages of the prior art automobile sun visor attachments and none of the disadvantages.

To attain this, a representative embodiment of the concepts of the present invention is illustrated in the drawings and makes use of an elastic fabric cover which is tightly stretched over an existing original equipment type sun visor. Various assorted pockets may be provided on front and back surfaces of the elastic fabric cover. A two channel plastic strip may be positioned around the periphery of the original equipment sun visor before stretching the cover over the original sun visor. This provides a sliding track for an auxiliary sun shade which is designed to be slid out of a slot on one end of the elastic cover. The auxiliary sun shade may further be provided with additional storage facilities. The elastic cover may be provided with a storage pouch on one side imprinted with personalized information. When the sun visor is in a flip down condition, the personalized information is displayed to the public through the windshield, by being imprinted on the elastic fabric.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile sun visor attachment which has all the advantages of the prior art automobile sun visor attachments and none of the disadvantages.

It is another object of the present invention to provide a new and improved automobile sun visor attachment which may be easily and efficiently manufactured and marketed.

It is a further object of the present invention to provide a new and improved automobile sun visor attachment which is of a durable and reliable construction.

An even further object of the present invention is to provide a new and improved automobile sun visor attachment which is susceptible of a low cost of manufacture with regard to both materials and labor, and which accordingly is then susceptible of low prices of sale to the consuming public, thereby making such automobile sun visor attachments economically available to the buying public.

Still yet another object of the present invention is to provide a new and improved automobile sun visor attachment which provides in the apparatuses and methods of the prior art some of the advantages thereof, while simultaneously overcoming some of the disadvantages normally associated therewith.

Still another object of the present invention is to provide a new and improved automobile sun visor attachment which is in the form of a cover made of a stretchable elastic fabric material provided with various storage compartments.

Yet another object of the present invention is to provide a new and improved automobile sun visor attachment having a two channel strip which is mounted around the periphery of an existing sun visor to provide a sliding track for the support of an auxiliary sun visor.

Even still another object of the present invention is to provide a new and improved automobile sun visor attachment wherein provisions for displaying personalized information to the public through the windshield when the visor is in a flip down position are provided.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
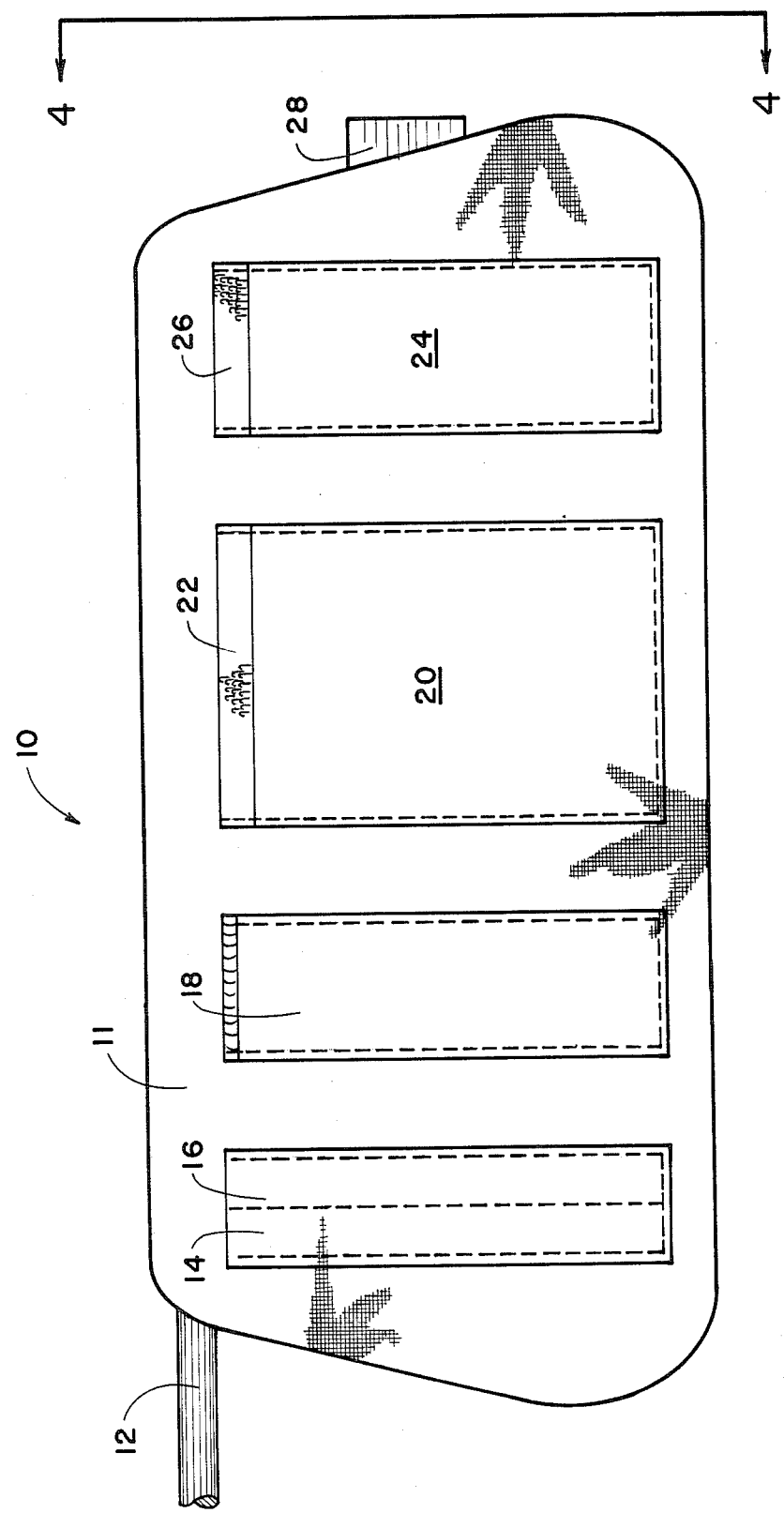
FIG. 1 is a front view of the sun visor attachment of the present invention.

With reference now to the drawings, and in particular to FIG. 1 thereof, a new and improved automobile sun visor attachment embodying the principles and concepts of the present invention and generally designated by the reference numeral 10 will be described.

More specifically, it will be noted that the first embodiment 10 of the invention includes an elastic cover 11 which is preferably formed of a stretchable fabric, for example, a stretchable polyester. This allows for easy cleaning of the cover by allowing it to be machine washed. The cover may be provided in various colors to match the interior colors of different vehicles. The cover is provided with an open end which is stretched over an existing original equipment type sun visor which is pivotable about a horizontal axis on a conventional visor rod 12. Various assorted storage compartments may be provided on a front face of the cover 11, for example, pen and pencil compartments 14 and 16, a comb pocket 18, a sunglasses storage pouch 20 which is secured by a VELCRO fastener 22, and an accessory compartment 24 which is secured by a VELCRO fastener 26. A tab 28 is provided for opening and closing an auxiliary sun shade.

Figure 2:
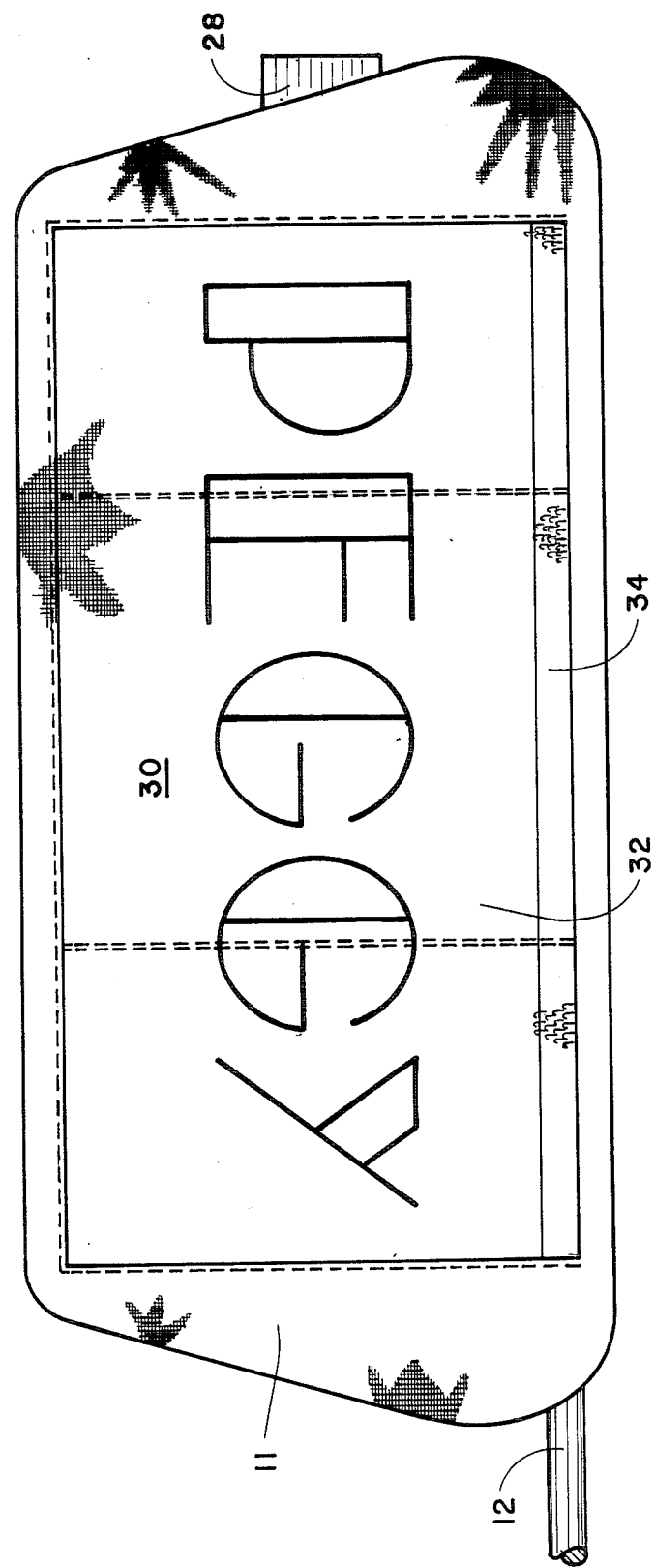
FIG. 2 is a view of the back side of the sun visor attachment of the present invention.

With reference now to FIG. 2, the back side of the sun visor cover 11 of the present invention is illustrated with the visor in a flip up position on visor rod 12. A storage pouch 30 may be provided. The pouch 30 is preferably formed from the same stretch material and is stitched to the elastic fabric cover 11 and secured by a VELCRO fastener 34. A personalized logo may be inscribed or painted on the pouch 30 whereby, with the visor in a flip down position, the logo is visible to the public through the windshield.

Figure 3:
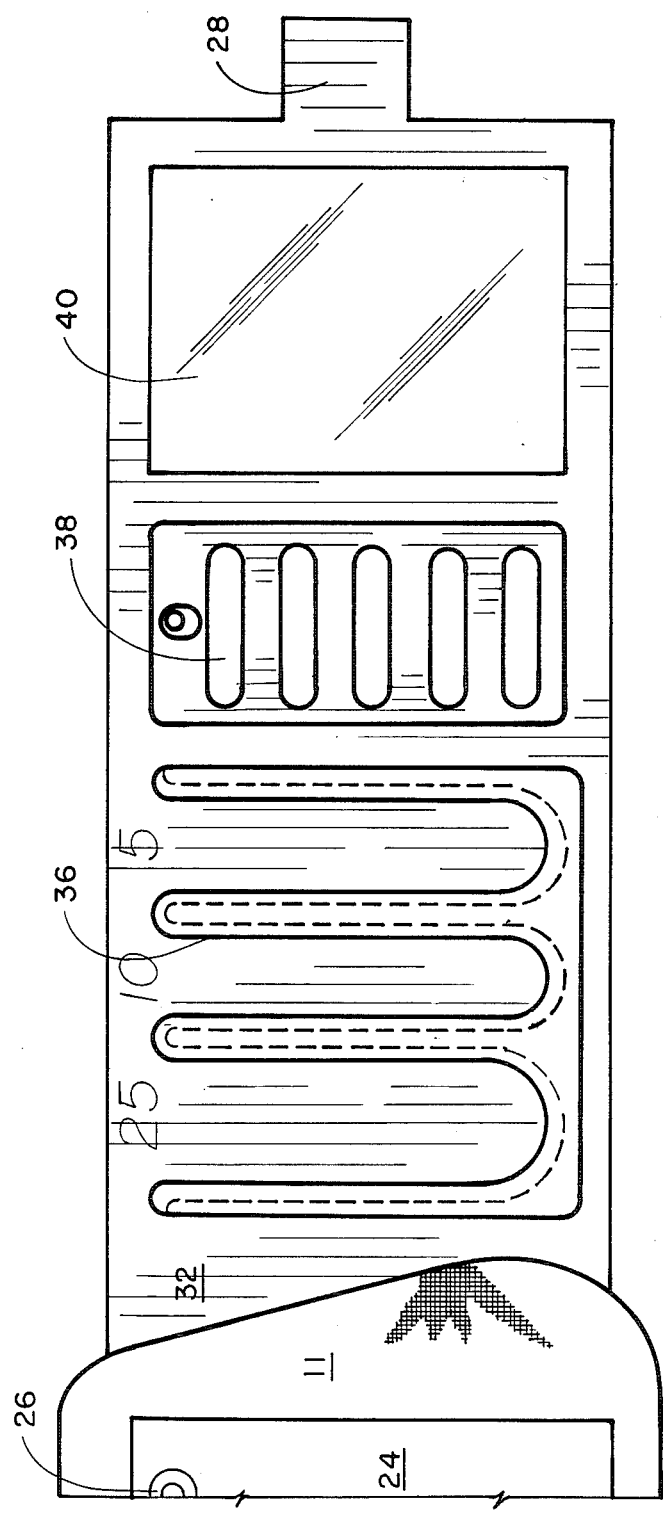
FIG. 3 is a front view of the sun visor attachment of the present invention with the auxiliary sun visor in an open position.

With reference now to FIG. 3, a view of the auxiliary sun visor 32 in an open position is provided. Various assorted storage compartments may be provided on the auxiliary sun visor 32. For example, a change rack 36 having a plurality of separate compartments for the next and organized storage of change, may be formed on a front side of the auxiliary storage visor 32. This allows easy access to the correct amount of change needed when traveling on toll highways. An air freshener 38 may be provided on the auxiliary sun visor 32, such that the air freshener is activated when the sun visor is in an open position. This prevents an over usage of the air freshener as is a problem with conventional air fresheners which, for example, are hung from a rear view mirror. An adjustable closure strip may also be provided for the air freshener. A mirror 40 may also be mounted on the auxiliary sun visor 32. In use, the auxiliary sun visor 32 is moved between open and closed positions by grasping a tab 28.

Figure 4:
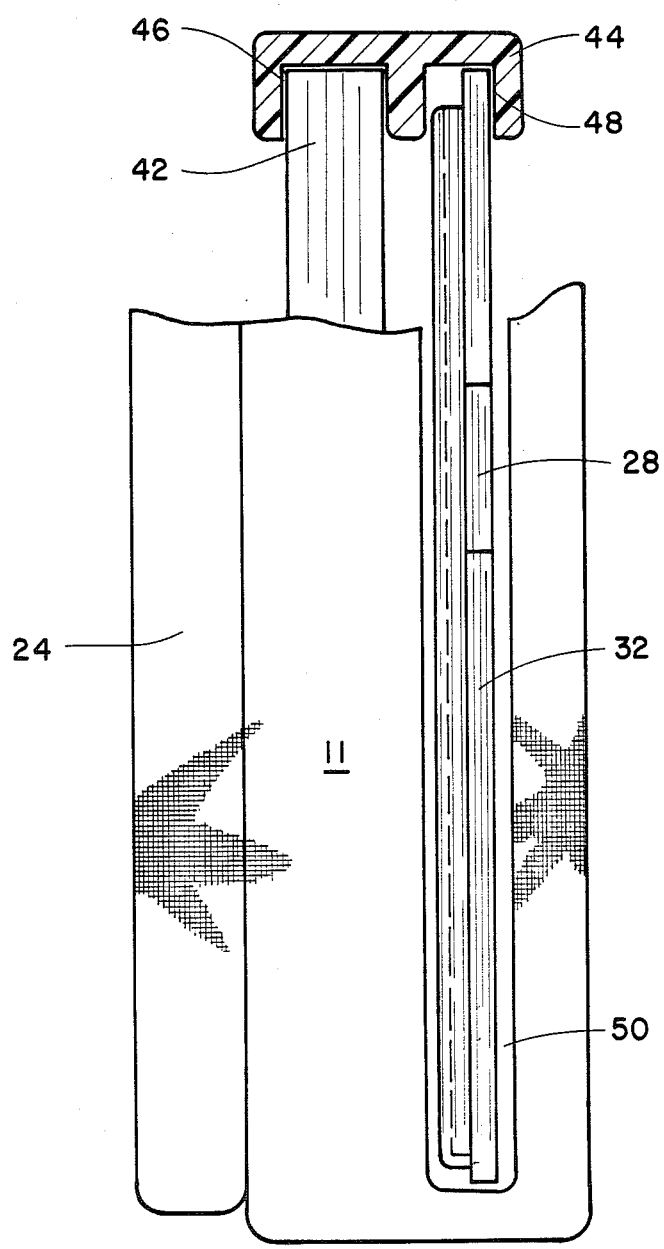
FIG. 4 is an end view of the sun visor attachment of the present invention.

With reference now to FIG. 4, an end view looking at the right end of the sun visors as in FIG. 1, is illustrated. A resilient plastic two channel strip 44 is applied around the periphery of the original equipment sun visor 42. The plastic two channel strip 44 has a first channel 46 which is dimensioned to firmly engage the edge of the original equipment sun visor 42. The plastic two channel strip 44 may be supplied in a roll which is unwound, and then is stretched around the periphery of the visor 42 and then cut to length. The plastic two channel strip 44 has a second channel 48 which provides a track in which the auxiliary sun visor 32 will slide. Tab 28 is utilized to slide the auxiliary visor 32 in the channel 48. The elastic stretchable fabric cover 11 has a slot 50 through which the auxiliary sun visor 32 will pass. The side of the compartment 24 is visible in FIG. 4. The cover 11 is shown as partially cut away to reveal the details of the plastic two channel strip 44. It is to be understood that a similar configuration is utilized at the bottom portion of the sun visor.

The automobile sun visor attachment of the present invention is intalled by first applying the two channel strip 44 around the persipheral edge of the original equipment sun visor 42. Then, the cover 11 is stretched over the visor 42 and two channel strip 44. The auxiliary sun visor 32 is then slipped through slot 50 into channel 48. Various personalized logos or a vehicle maintenance log sheet may be provided on a back surface of the auxiliary sun visor 32.

As another option, it is contemplated that a three channel strip may be utilized in place of the two channel strip 44. The third channel would form a narrow strip for the insertion of personalized information and/or emergency messages to be displayed. In the illustrated embodiment, the personalized logo is mounted or painted on the back side of the elastic fabric cover 11, on the storage pouch 30, as shown in FIG. 2.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved automobile sun visor attachment comprising:
   cover means formed from an elastic stretchable fabric material;
   storage compartment means on said cover means;
   said cover means having a slot at one end thereof;
   auxiliary sun visor means slidable in said slot; and
   a two channel strip for mounting around a periphery of an automobile sun visor and which forms a track for mounting said auxiliary sun visor means for sliding movement.

2. The automobile sun visor attachment of claim 1, wherein said storage compartment means comprises a plurality of compartments disposed on both sides of said cover means.

3. The automobile sun visor attachment of claim 2, wherein a storage compartment on a back side of said cover means comprises at least one pocket.

4. The automobile sun visor attachment of claim 3, wherein said auxiliary sun visor means has personalized information on a back side of said elastic cover, whereby said personalized information is displayed to the public through a windshield of an automobile when the visor is in a flip down position.

5. The automobile sun visor attachment of claim 1, further comprising storage means formed on said auxiliary sun visor.

6. The automobile sun visor attachment of claim 5, wherein said auxiliary storage means includes a coin rack.

7. The automobile sun visor attachment of claim 1, further comprising air freshener means on said auxiliary sun visor means.

8. A new and improved automobile sun visor attachment for use in a vehicle having a transparent window, comprising:
   a cover formed from an elastic stretchable fabric material;
   a plurality of storage compartments formed on a first side of said cover;
   at least one storage pouch formed on a back side of said cover;
   said cover having a slot formed at one end thereof;
   an auxiliary sun visor slidable in said slot;
   a two channel strip having a first channel for engaging a peripheral edge of an automobile sun visor and a second channel supporting said auxiliary sun visor for sliding movement;
   a personalized logo on a back side of said elastic fabric cover for display through said transparent vehicle window when the sun visor is in a flip down position; and
   a coin storage rack formed on a front side of said auxiliary sun visor.

* * * * *